(12) United States Patent
Lin

(10) Patent No.: US 11,490,365 B2
(45) Date of Patent: Nov. 1, 2022

(54) METHOD TO HANDLE JOINT RESTRICTION OF TRANSMISSION RESOURCE AND DATA QOS REQUIREMENT

(71) Applicant: MEDIATEK INC., Hsin-Chu (TW)

(72) Inventor: Guan-Yu Lin, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 106 days.

(21) Appl. No.: 17/065,643

(22) Filed: Oct. 8, 2020

(65) Prior Publication Data
US 2021/0153169 A1  May 20, 2021

Related U.S. Application Data

(60) Provisional application No. 62/935,667, filed on Nov. 15, 2019.

(51) Int. Cl.
| | |
|---|---|
| *H04W 4/00* | (2018.01) |
| *H04W 72/02* | (2009.01) |
| *H04W 72/12* | (2009.01) |
| *H04L 1/18* | (2006.01) |
| *H04W 72/10* | (2009.01) |

(52) U.S. Cl.
CPC .......... *H04W 72/02* (2013.01); *H04L 1/1819* (2013.01); *H04W 72/10* (2013.01); *H04W 72/1231* (2013.01); *H04W 72/1263* (2013.01)

(58) Field of Classification Search
CPC . H04W 72/02; H04W 72/10; H04W 72/1231; H04W 72/1263; H04W 72/0406; H04W 92/18; H04W 72/087; H04W 76/14; H04L 1/1819; H04L 1/1812; H04L 1/1893; H04L 5/0055; H04L 5/006
USPC .................................................. 370/329, 330
See application file for complete search history.

(56) References Cited

U.S. PATENT DOCUMENTS

| | | | |
|---|---|---|---|
| 2020/0053699 A1* | 2/2020 | Chen ........................ | H04W 4/40 |
| 2021/0105743 A1* | 4/2021 | Lin ......................... | H04W 72/10 |
| 2021/0144727 A1* | 5/2021 | Pan ..................... | H04W 28/0268 |
| 2022/0015070 A1* | 1/2022 | Chen ................. | H04W 72/0453 |
| 2022/0022228 A1* | 1/2022 | Wang ...................... | H04W 4/46 |

* cited by examiner

*Primary Examiner* — Chuong T Ho
(74) *Attorney, Agent, or Firm* — Imperium Patent Works; Zheng Jin (57) ABSTRACT

A method of joint restriction on resource selection and data multiplexing over sidelink transmission is proposed. The joint restriction method includes four steps of A, B, C, D, and the order of the steps can be different depending on different scenarios. In step A, UE selects a resource pool that satisfies certain configuration. In step B, UE determines resource for transport block (TB) transmission. In step C, UE performs logical channel prioritization (LCP) procedure. In step D, UE provides information of the TB to receiver UE(s) if needed. Under this generic model, the selecting of resource and data are jointly considered to satisfy both resource restriction and data QoS requirements.

18 Claims, 5 Drawing Sheets

DECISION FOR HARQ ENABLED/DISABLED

CONDITION FOR RX UE TO RELEASE
HARQ PROCESS

METHOD TO HANDLE JOINT RESTRICTION OF TRANSMISSION RESOURCE AND DATA QOS REQUIREMENT

CROSS REFERENCE TO RELATED APPLICATIONS

This application claims priority under 35 U.S.C. § 119 from U.S. Provisional Application No. 62/935,667, entitled "Method to Handle Joint Restriction of Transmission Resource and Data QoS Requirement," filed on Nov. 15, 2019, the subject matter of which is incorporated herein by reference.

TECHNICAL FIELD

The disclosed embodiments relate generally to wireless network communications, and, more particularly, to resource allocation restriction for sidelink transmission in 5G new radio (NR) vehicle-to-everything (V2X) wireless communications systems.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. An established communication protocol such as 4G LTE and 5G New Radio (NR) can be used over the licensed spectrum to provide a first communication link, and LTE/NR can also be used over the unlicensed spectrum to provide a second communication link. In New Radio-Unlicensed (NR-U), any downlink and uplink access have to follow the listen-before-talk (LBT) channel access procedure, as unlicensed frequencies are also used by other networks such as WiFi.

For in-coverage UEs, a base station can schedule the data traffic over Uu link. For out-of-coverage UEs, UE can schedule the data traffic over PC5 (or sidelink). As compared to WiFi and NR unlicensed spectrum operation, a PC5 link (or sidelink) based mobile device potentially possesses the following features: 1) deployment by both operator can user; 2) operation in both unlicensed spectrum and licensed spectrum; 3) similar protocol stacks complexity to WiFi; 4) better multiplexing efficiency than WiFi; 5) better mobility support than WiFi, e.g., service continuity; 6) larger maximal TX power than WiFi for larger coverage: 7) support multi-hop relay.

In sidelink communication, there are two scheduling mode, i.e. for a UE, the transmission resource for sidelink communication can be selected by NW (mode-1) or selected by UE itself (mode-2). Regardless of which scheduling mode a UE is operating on, UE should first select sidelink resource, and then select data to be transmitted on the sidelink resource. The selected sidelink resource may determine/restrict what kind of data (traffic characteristic) can be transmitted by the selected resource, while the selected data to transmit would further determine/restrict what kind of resource can be used to deliver these data. That is, there is some restriction on the transmission resource (e.g. whether a resource pool has HARQ feedback resource, how much power can be used to transmit), and some restriction on the sidelink data (e.g. QoS and latency requirement, priority, requirement of HARQ feedback for re-transmission). UE needs to schedule resource and data so that restriction on both sides can be satisfied.

In legacy LTE specification, UE first selects SL resource, and then selects SL data to be multiplexed into the SL data. However, the selected data would impact what kind of transmission resource can be selected. As a result, the order of selecting resource and selecting data may be different depending on the specific kind of resource or data restriction. Therefore, a more general model is desired to handle the joint problem of selecting resource and data. In addition to radio resource restriction and data QoS restriction, another restriction is the hardware, i.e. limited number of HARQ process to handle transmission and reception. It is still not clear how UE should handle the issue of HARQ process/buffer shortage.

A solution is sought.

SUMMARY

A method of joint restriction on resource selection and data multiplexing over sidelink transmission is proposed. The joint restriction method includes four steps of A, B, C, D, and the order of the steps can be different depending on different scenarios, e.g. depending on the specific kind of resource or data restriction. In step A, UE selects a resource pool that satisfies certain configuration. In step B, UE determines resource for transport block (TB) transmission. In step C, UE performs logical channel prioritization (LCP) procedure. In step D, UE provides information of the TB to receiver UE(s) if needed. Under this generic model, the selecting of resource and data are jointly considered to satisfy both resource restriction and data QoS requirements.

In one embodiment, a UE obtains resource pool and resource configuration for transmission over sidelink logical channels (SL LCHs) for new radio (NR) SL communication. Each SL LCH is mapped to a sidelink radio bearer (SLRB). The UE selects a resource pool satisfying a number of resource pool configuration parameters, and determines a resource configuration for a transport block (TB) transmission. The UE performs a Logical Channel Prioritization (LCP) procedure over a selected resource that satisfies QoS requirements of corresponding SLRBs. SL data from LCHs are selected to form the TB based on joint considerations of the resource pool selection, the resource configuration, and the QoS requirements. The UE transmits sidelink control information (SCI) of the TB and the TB to a receiver UE.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
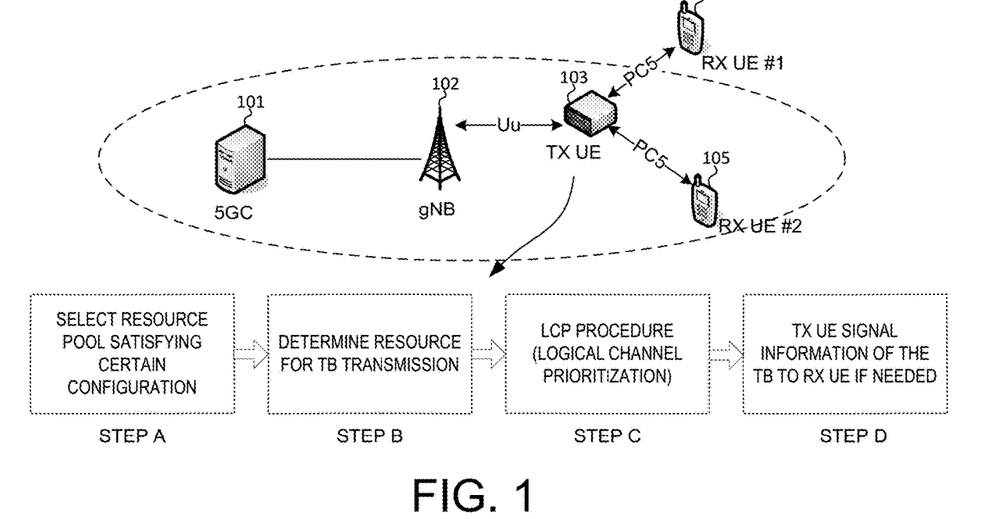
FIG. 1 illustrates a wireless communications system supporting joint restriction of resource and data QoS requirement for sidelink transmission in accordance with a novel aspect.

FIG. 1 illustrates a wireless communications system 100 supporting joint restriction of resource and data QoS requirement for sidelink transmission in accordance with a novel aspect. 5G new radio (NR) mobile communication network 100 comprises a 5G core (5GC) 101, a base station gNodeB 102, and a plurality of user equipments UE 103, UE 104, and UE 105. For in-coverage UEs, e.g., UE 103, a base station can schedule sidelink resource over Uu link for UE to perform sidelink communication (i.e. network scheduling); or, in another resource allocation mode, UE 103 can select sidelink resource for transmission by itself (i.e. UE autonomous scheduling). For out-of-coverage UEs, e.g., UE 104, since the scheduling from base station is not available, UE 104 can only select resource for sidelink communication by itself.

In LTE and new radio (NR) networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI). The DCI format is a predefined format in which the downlink control information is formed and transmitted in PDCCH. Similarly, Physical Sidelink Control Channel (PSCCH) is used for sidelink (SL) scheduling of Physical Sidelink Shared Channel (PSSCH) transmission. The sidelink scheduling information carried by PSCCH is referred to as sidelink control information (SCI). SCI is transmitted over sidelink from TX UE to RX UE. The SCI format is a predefined format in which the sidelink control information is formed and transmitted in PSSCH. Both DCI format and SCI format give the UE scheduling details such as number of resource blocks, resource allocation type, modulation scheme, transport block, redundancy version, coding rate etc.

In sidelink communication, there are two scheduling modes, i.e. for a UE, the transmission resource for sidelink communication can be selected by NW (mode-1) or selected by UE itself (mode-2). Regardless of which scheduling mode a UE is operating on, UE should first select sidelink resource, and then select data to be transmitted on the sidelink resource. The selected sidelink resource may determine/restrict what kind of data (traffic characteristic) can be transmitted by the selected resource, while the selected data to transmit would further determine/restrict what kind of resource can be used to deliver these data. That is, there is some restriction on the transmission resource (e.g. whether a resource pool has HARQ feedback resource, how much power can be used to transmit), and some restriction on the sidelink data (e.g. QoS and latency requirement, priority, requirement of HARQ feedback for re-transmission). UE needs to schedule resource and data so that restriction on both sides can be satisfied.

In accordance with one novel aspect, a method of joint restriction on resource selection and data multiplexing over sidelink transmission is proposed. In the example of FIG. 1, the joint restriction method includes four steps of A, B, C, D, and the order of the steps can be different depending on different scenarios. In step A, UE 103 selects a resource pool that satisfies certain configuration. In step B, UE 103 determines resource for transport block (TB) transmission. In step C, UE 103 performs logical channel prioritization (LCP) procedure. In step D, UE 103 provides information of the TB to receiver UE(s) if needed. Under this generic model, the order of selecting resource and selecting data may be different depending on the specific kind of resource or data restriction. In addition to resource restriction and data QoS restriction, a method of handling HARQ process or buffer shortage is also proposed.

Figure 2:
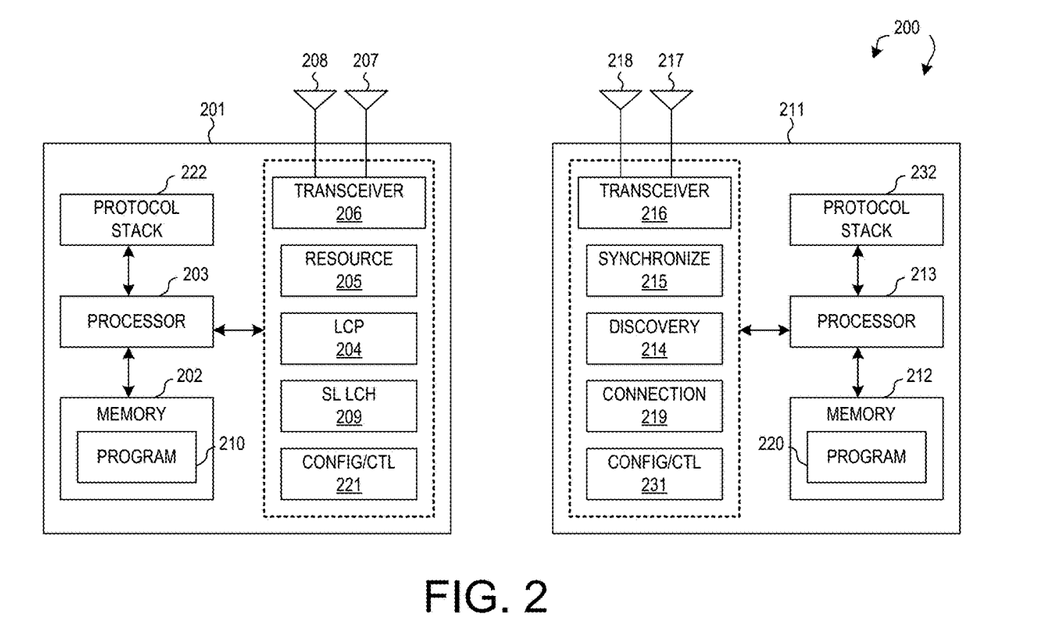
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station or a relay UE), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay or TX UE that includes a protocol stack 222, a resource management circuit 205 for allocating and scheduling sidelink resource, an LCP handling module 204 for performing SL LCP, a connection handling circuit 209 for establish sidelink connections and logical channels with remote UEs, and a control and configuration circuit 221 for providing control and configuration information. Wireless device 211 is a remote or RX UE that includes a protocol stack 232, a synchronization handling circuit 215, a relay discovery circuit 214 for discovering relay UEs, a connection handling circuit 219 for establishing sidelink connections, and a configuration and control circuit 231. The different functional modules and circuits can be implemented and configured by software, firmware, hardware, and any combination thereof.

The function modules and circuits, when executed by the processors 203 and 213 (e.g., via executing program codes 210 and 220), allow relay UE 201 and remote UE 211 to perform embodiments of the present invention accordingly. In one example, UE 201 obtains resource pool and resource configuration, and performs resource pool selection, resource configuration determination, and LCP procedure. UE 201 selects SL data from certain logical channels to form a transport block based on joint considerations of the resource pool selection, the resource configuration, and the QoS requirements. If UE finds that his highest priority SL LCH with data available for transmission need HARQ feedback, the TB needs HARQ feedback. If UE finds that his highest priority SL LCH with data available for transmission need not HARQ feedback, the TB needs not HARQ feedback, and UE does not multiplex any data requiring HARQ feedback into the same TB as the highest priority SL LCH data during SL LCP. If a TB is HARQ enabled, UE selects a resource pool with HARQ feedback resource. If a TB is HARQ disabled, UE selects a resource pool with or without HARQ feedback resource. UE 201 can also provide this information to the receiver UE, e.g., the transmitter UE indicates an indicator for HARQ feedback enabled/disabled status of this TB in the associated sidelink control information (SCI).

Figure 3:
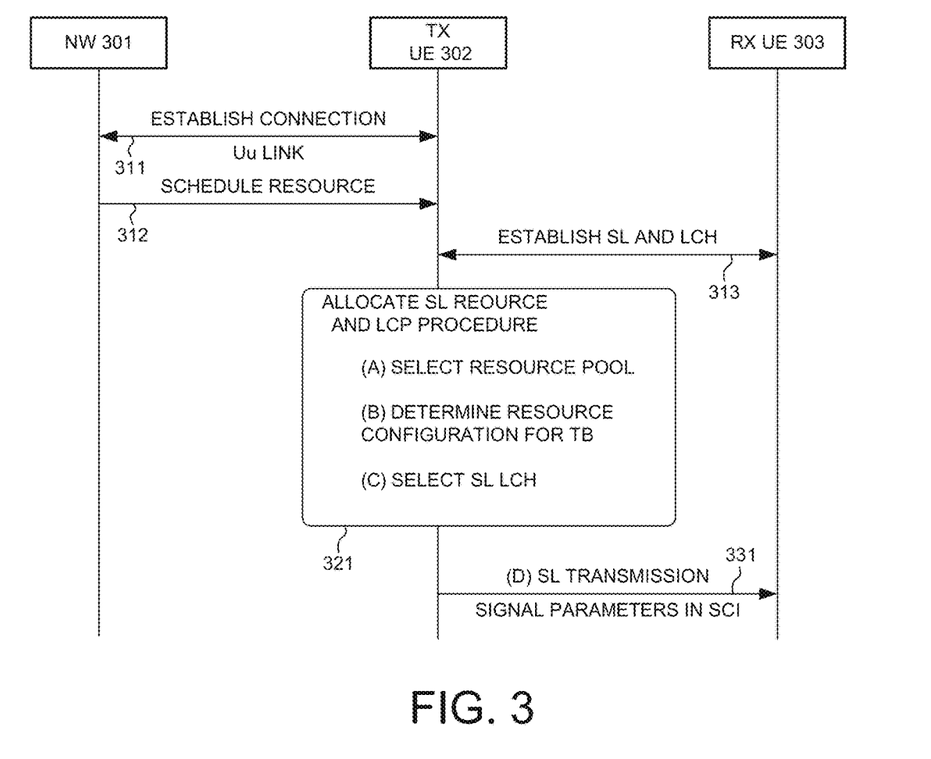
FIG. 3 illustrates a sequence flow between network and transmitter UE and receiver UE for resource selection and data multiplexing over sidelink transmission.

FIG. 3 illustrates a sequence flow between network 301 and transmitter UE 302 and receiver UE 303 for resource selection and data multiplexing over sidelink transmission. In step 311, the network 301 establishes a connection with TX UE 302 over Uu link. In step 312, TX UE 302 receives various broadcast and/or unicast information from the network, including scheduling information and resource allocation. Note that a base station can schedule sidelink resource over Uu link for UE to perform sidelink communication (i.e. network scheduling). Alternatively, a UE can select sidelink resource for transmission by itself (i.e. UE autonomous scheduling). In step 313, TX UE 302 establishes PC5-RRC connection with RX UEs 303. Note that if a TX UE is performing broadcasting, then the TX UE does not need not build any SL connection with the RX UE before the TX UE sends data. For SL communication and QoS management, multiple sidelink radio bearers (SLRBs) can be established, and each SLRB is mapped to a distinct sidelink logical channel (SL LCH). In addition, each SLRB is mapped to one or more QoS flows that define the QoS requirements for the corresponding SL LCH.

In NR, when a new transmission is performed by the TX UE to RX UEs over sidelinks, TX UE needs to construct a new transport block (TB) by multiplexing data from the different logical channels of each RX UE. The sidelink Logical Channel Prioritization (LCP) procedure is applied whenever the new transmission is performed. The LCP procedure allocates resource based on LCH priority to satisfy QoS requirement. In constructing the TB with data from multiple LCHs, the data from the highest priority LCH are served first in the TB, followed by data from the next highest priority LCH, continuing until the TB space runs out. The configuration of each sidelink logical channel is controlled by the network, e.g. through dedicated RRC signaling, system information, or pre-configuration. In step 321, TX UE 302 allocates SL resource and performs LCP procedure for a new SL transmission to RX UE 303. UE 302 handles joint restriction of transmission resource and data QoS requirement. The joint restriction method includes A) selecting resource pool, B) determining resource configuration, and C) performing LCP procedure, the order of the steps can be difference depending on different scenarios.

In step A, UE 302 selects a resource pool satisfies certain configuration. Feature of resource pool include 1) cast type, e.g. dedicated use for unicast, groupcast, or broadcast; 2) QoS specific, e.g. dedicated for certain QoS priority, e.g., a range of SL LCH priority, a rage of PC5-5QI priority; 3) measured CBR (channel busy ratio); 4) TX parameter or constraint—HARQ maximum transmission number, MCS level, applicable PSSCH frequency range, applicable slot aggregation level in time domain, max transmission power; 5) QoS CBR specific—a SL traffic with a specific QoS can use the resource pool if UE measured channel quality or CBR or measurement congestion related metric is below a threshold; 6) whether the resource pool has HARQ feedback resource configured or not. In step B, UE 302 determines resource for transport block (TB) transmission. UE 302 determines the highest-priority SL data to be transmitted in this TB, or selects resource to satisfy the highest-priority data, e.g. latency performance, conservative modulation and coding scheme (MCS). In step C, UE 302 performs logical channel prioritization (LCP) procedure. UE 302 selects data only from some LCHs based on constraint from the previous steps into the TB.

In step 331, UE 302 transmits sidelink control information (SCI over PSCCH) and sidelink data (TB over PSSCH) to UE 303 over the selected sidelink resource. SCI includes signal parameters of the TB (if not implicitly suggested by the selected resource or resource pool (step D). Possible parameters include 1) cast type, MCR (minimum communication range) for groupcast; 2) indicator to indicate whether HARQ feedback is enabled or disabled, HARQ feedback mode (ACK/NACK or NACK only) for groupcast, maximum number of re-transmissions; 3) time-frequency location of the transmission resource; 4) scheduling mode; and 5) priority indication.

Figure 4:
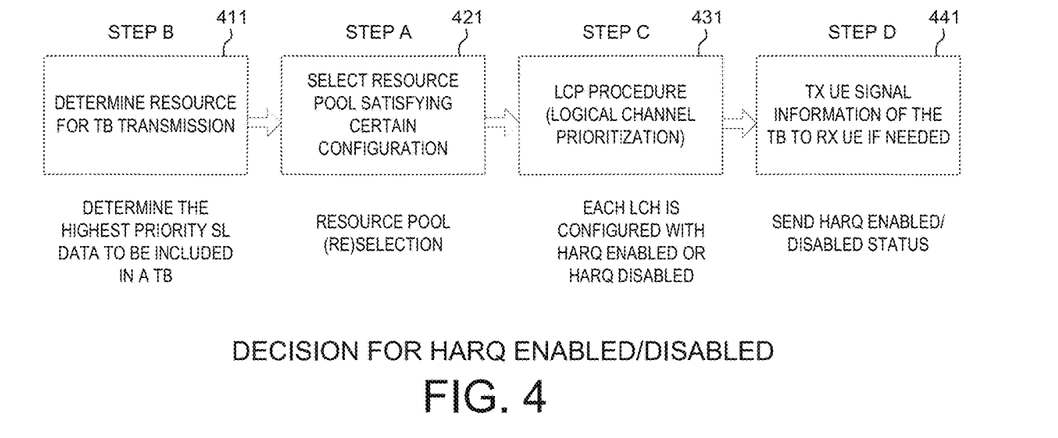
FIG. 4 illustrates an embodiment of decision on HARQ feedback enabled/disabled over sidelink transmission in accordance with one novel aspect.

FIG. 4 illustrates an embodiment of decision on HARQ feedback enabled/disabled over sidelink transmission in accordance with one novel aspect. The decision for HARQ feedback enabled/disabled of a TB involves the following steps: B→(A)→C→D. In step 411 (step B), UE determines the highest-priority SL data to be included in this TB. If the highest-priority SL data requires HARQ feedback, this TB requires HARQ feedback; otherwise, the TB needs not HARQ feedback. In step 421 (step A), UE (re)selects resource pool. If this TB requires HARQ feedback, and if resource pool has not HARQ feedback resource configured (PSFCH), then UE reselects a resource pool with HARQ feedback resource configured. If this TB does not require HARQ feedback, then UE needs not change resource pool, i.e., UE can use resource with or without resource pool. In step 431 (step C), UE performs LCP. Each sidelink logical channel is configured with either HARQ enabled or HARQ disabled. If the TB is configured with HARQ feedback (determined in B), then all SL data included in this TB should be HARQ enabled. In step 441 (step D), UE sends the HARQ enabled or disabled status of the TB in SCI over PSCCH, as well as TB data over PSSCH. The SCI contains information on how to decode (HARQ feedback mode or option), priority, cast mode, source/destination ID etc.

Figure 5:
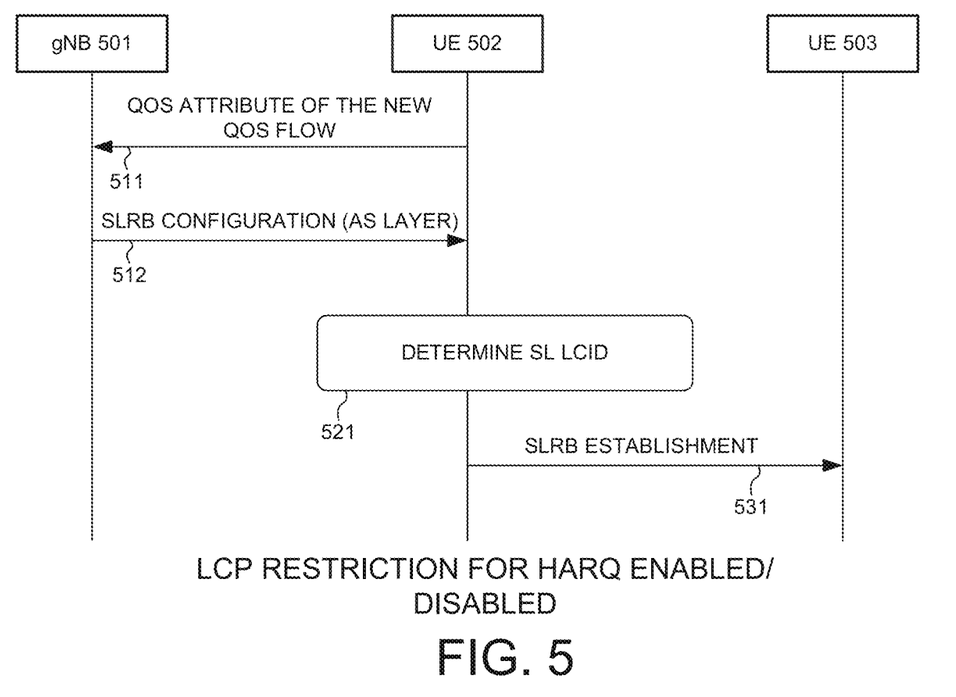
FIG. 5 illustrates one embodiment of LCID selection and LCP restriction for HARQ enabled/disabled in accordance with one novel aspect.

FIG. 5 illustrates one embodiment of LCID selection and LCP restriction for HARQ enabled/disabled in accordance with one novel aspect. For SL communication and QoS management, multiple sidelink radio bearers (SLRBs) can be established, and each SLRB is mapped to a distinct sidelink logical channel (SL LCH), and each SLRB is mapped to one or more QoS flows that define the QoS requirement for the SL LCH. Each SL LCH is associated with a SL LCG (logical channel group). In step 511, UE 502 sends QoS attribute of the new QoS flow. In step 512, gNB 501 sends SLRB configuration in AS layer to UE 502. The SLRB configuration configures the associated SL LCG for SL BSR per SL LCG. The network thus configures the SLRB ID associated with the reported QoS flow/attribute in step 512, the configuration of a (new or modified) SL LCH associated with the SLRB, and the SL LCG ID associated with the SL LCH. In step 521, UE 502 determines the SL logic channel ID (LCID) of the (new or modified) SL LCH by itself. In step 531, UE 502 sends SLRB establishment request to UE 503 to establish the SLRB. The SLRB establishment message can be carried by a PC5-RRC message for PC5-RRC reconfiguration. During SL resource selection, if UE finds that the highest priority SL LCH with data available for transmission needs HARQ feedback, then the TB needs HARQ feedback. If UE finds that the highest priority SL LCH with data available for transmission does not need HARQ feedback, then the TB does not need HARQ feedback, and UE does not multiplex any data requiring HARQ feedback into this TB during SL LCP. If after SL resource selection, UE's next step is resource pool selection (not yet done), and UE already determines this TB as HARQ enabled/disabled during SL LCP (SL LCP is already done). If this TB is HARQ enabled, UE selects a resource pool with HARQ feedback resource. If this TB is HARQ disabled, UE selects a resource pool with or without HARQ feedback resource.

Figure 6:
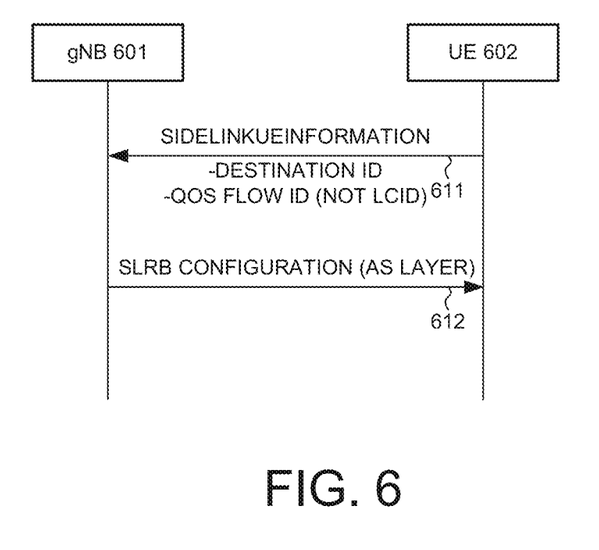
FIG. 6 illustrates another embodiment of LCID selection and LCP restriction for HARQ enabled/disabled in accordance with one novel aspect.

FIG. 6 illustrates another embodiment of LCID selection and LCP restriction for HARQ enabled/disabled in accordance with one novel aspect. In step 611, UE 602 sends SidelinkUEInformation to gNB 601. The information comprises destination UE ID and QoS flow ID, but not LCID. That is, in SidelinkUEInformation, UE 602 links the Destination UE with several SLRB ID, LCG ID, or QFI/PQI, i.e., the QoS information is represented by SLRB ID or QFI/PQI (i.e. not LCID). In step 612, gNB 601 sends SLRB configuration in AS layer to UE 602. Similar to the embodiment of FIG. 5, the network configures the SLRB ID and the associated LCG ID, but UE 502 determines the LCID by itself for SLRB establishment. If the network does not know the LCID associated with the SLRB, then QoS information in UE assistance information can be LCG ID or SLRB ID of QoS flow ID.

Figure 7:
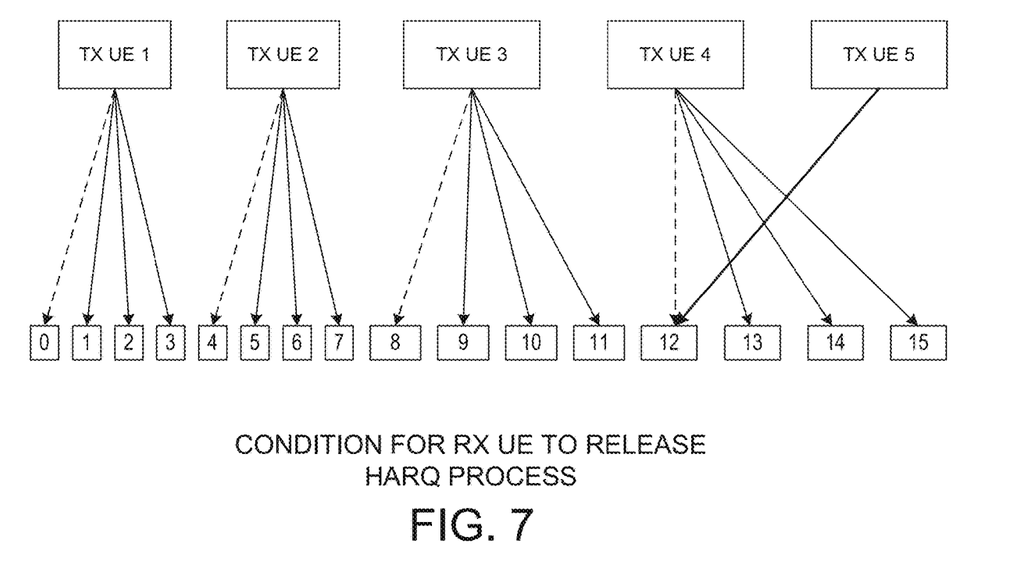
FIG. 7 illustrates HARQ process occupation and HARQ process release for sidelink transmission in accordance with one novel aspect.

FIG. 7 illustrates HARQ process occupation and HARQ process release for sidelink transmission in accordance with one novel aspect. At Transmitter side, Tx UE may send notification to Rx UE if the Tx UE move some or all of HARQ process from the Rx UE to other destination UE. Tx UE can also send a value to suspend the transmission. Tx UE can release the HARQ process for the destination UE if one or more of the following conditions is satisfied: 1) a period of time since the previous TB reception; 2) bad link condition; and 3) Upon PC5-RRC connection release. At Receiver side, since Rx UE receives a TB from Tx UE, Rx UE can release the HARQ process for the destination UE if one or more of the following conditions is satisfied: 1) The re-transmission of the TB is terminated; 2) The TB has been received successfully; 3) The Rx UE does not receive SCI from the Tx UE for new transmission or re-transmission for a while; 4) A period of time since the previous TB reception; and 5) When Rx UE receives an marker from the TX UE to inform the Rx UE that it can release the HARQ process with some condition.

In the example of FIG. 7, there are five Tx UEs. Rx UE cannot receive data from TX UE 5 because all receiving HARQ process (Sidelink process) are occupied by other TX UEs. In legacy Uu behavior, a UE will not autonomously release HARQ process or clear HARQ buffer. This is because in Uu, UE has only one transmitter (gNB). Therefore, gNB can assign an occupied HARQ process with new data, and UE knows that gNB wants to overwrite the occupied HARQ process with new TB. However, in sidelink, if we follow Uu principle, even though TX UE 1~4 have already transmitting TB on HARQ process 0, 4, 8, 12 successfully, these HARQ processes are still occupied by TX UE 1~4, i.e. TX UE 5 cannot use HARQ process 0, 4, 8, 12 for new data transmission. In one novel aspect, once TB reception is successful, receiver UE consider the corresponding HARQ process as unoccupied, i.e. the unoccupied HARQ process can be used to receive data from other Tx UEs. For example, assume data reception from TX UEs 1,2,3, and 4 on HARQ processes 0, 4, 8, 12 is successfully completed, receiver UE then consider HARQ processes 0, 4, 8, 12 as unoccupied. As a result, any of the four HARQ processes can be used to receive data from TX UE 5.

Figure 8:
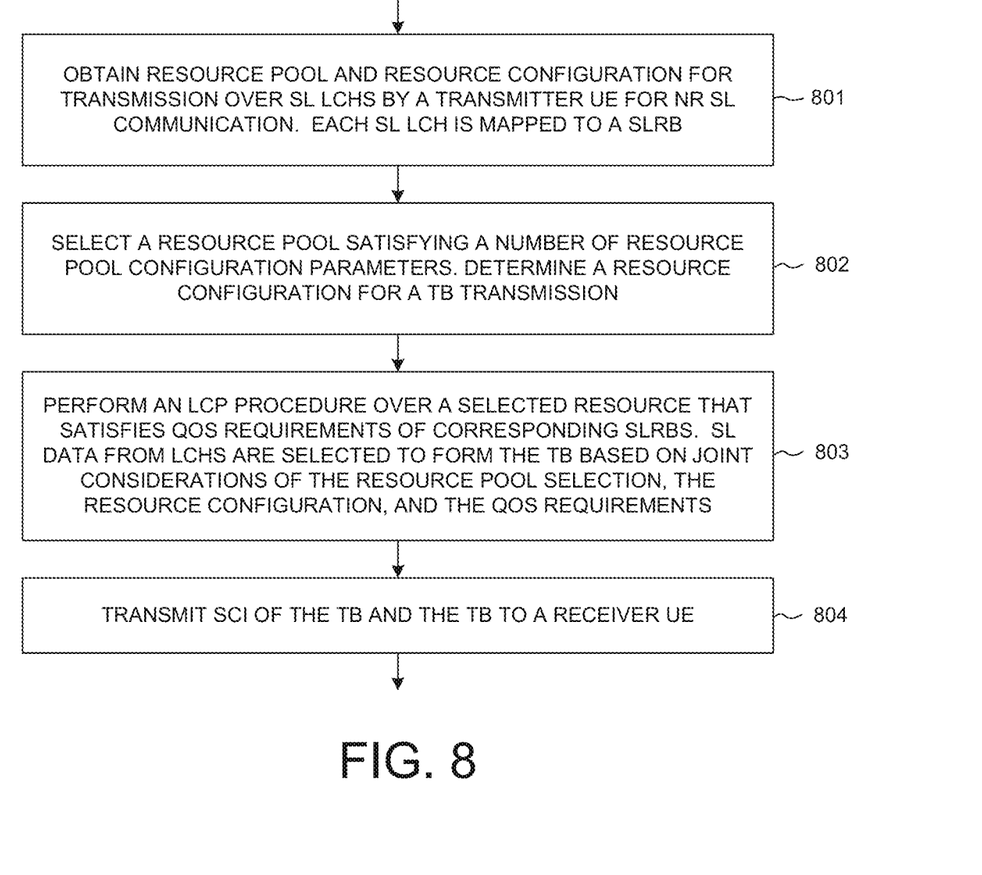
FIG. 8 is a flow chart of a method of resource selection and data multiplexing for sidelink transmission in accordance with one novel aspect.

FIG. 8 is a flow chart of a method of resource selection and data multiplexing for sidelink transmission in accordance with one novel aspect. In step 801, a UE obtains resource pool and resource configuration for transmission over sidelink logical channels (SL LCHs) for new radio (NR) SL communication. Each SL LCH is mapped to a sidelink radio bearer (SLRB). In step 802, the UE selects a resource pool satisfying a number of resource pool configuration parameters, and determines a resource configuration for a transport block (TB) transmission. In step 803, the UE performs a Logical Channel Prioritization (LCP) procedure over a selected resource that satisfies QoS requirements of corresponding SLRBs. SL data from LCHs are selected to form the TB based on joint considerations of the resource pool selection, the resource configuration, and the QoS requirements. In step 804, the UE transmits sidelink control information (SCI) of the TB and the TB to a receiver UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    obtaining resource pool and resource configuration for transmission data from sidelink logical channels (SL LCHs) by a transmitter user equipment (UE) for new radio (NR) SL communication, wherein each SL LCH is mapped to a sidelink radio bearer (SLRB), wherein each SLRB is associated with one or more quality of service (QoS) flows that defines corresponding QoS requirements;

selecting a resource pool satisfying a number of resource pool configuration parameters, and determining a resource configuration for a transport block (TB) transmission;

performing a Logical Channel Prioritization (LCP) procedure over a selected resource that satisfies QoS requirements of corresponding SLRBs, wherein SL data from LCHs are selected to form the TB based on joint considerations of the resource pool selection, the resource configuration, and the QoS requirements; and transmitting sidelink control information (SCI) of the TB and the TB to a receiver UE.

2. The method of claim 1, wherein the resource pool selection involves considering whether HARQ feedback resource is configured or not.

3. The method of claim 1, wherein the resource pool configuration parameters comprise at least one of a cast type, a QoS priority, a channel busy ratio (CBR), and transmission parameters.

4. The method of claim 1, wherein the resource configuration determination involves determining whether the highest-priority SL data requires HARQ feedback.

5. The method of claim 1, wherein the selected resource is associated with at least one of a time and frequency domain resource, a latency performance, a communication range, and a capability to transmit highest-priority data.

6. The method of claim 1, wherein the LCP procedure involves multiplexing only SL data that is HARQ enabled when the TB is configured with HARQ enabled.

7. The method of claim 1, wherein the joint consideration involves performing the resource pool selection, the resource configuration determination, and the LCP procedure in different orders.

8. The method of claim 1, wherein the SCI comprises a status indication on whether HARQ feedback is enabled or disabled for the corresponding TB.

9. The method of claim 1, wherein the SCI comprises at least one of a cast type, a minimum communication range for groupcast, indication on whether HARQ feedback is enabled or disabled, and an HARQ feedback mode.

10. A transmitter User Equipment (UE) comprising:

a configuration and controller that obtains resource pool and resource configuration for transmission data from over sidelink logical channels (SL LCHs) for new radio (NR) SL communication, wherein each SL LCH is mapped to a sidelink radio bearer (SLRB), wherein each SLRB is associated with one or more quality of service (QoS) flows that defines corresponding QoS requirements;

a resource management circuit that selects a resource pool satisfying a number of resource pool configuration parameters, and determines a resource configuration for a transport block (TB) transmission;

a Logical Channel Prioritization (LCP) handling circuit that performs an LCP procedure over a selected resource that satisfies QoS requirements of corresponding SLRBs, wherein SL data from LCHs are selected to form the TB based on joint considerations of the resource pool selection, the resource configuration, and the QoS requirements; and a transmitter that transmits sidelink control information (SCI) of the TB and the TB to a receiver UE.

11. The UE of claim 10, wherein the resource pool selection involves considering whether HARQ feedback resource is configured or not.

12. The UE of claim 10, wherein the resource pool configuration parameters comprise at least one of a cast type, a QoS priority, a channel busy ratio (CBR), and transmission parameters.

13. The UE of claim 10, wherein the resource configuration determination involves determining whether the highest-priority SL data requires HARQ feedback.

14. The UE of claim 10, wherein the selected resource is associated with at least one of a time and frequency domain resource, a latency performance, a communication range, and a capability to transmit highest-priority data.

15. The UE of claim 10, wherein the LCP procedure involves multiplexing only SL data that is HARQ enabled when the TB is configured with HARQ enabled.

16. The UE of claim 10, wherein the joint consideration involves performing the resource pool selection, the resource configuration determination, and the LCP procedure in different orders.

17. The UE of claim 10, wherein the SCI comprises a status indication on whether HARQ feedback is enabled or disabled for the corresponding TB.

18. The UE of claim 10, wherein the SCI comprises at least one of a cast type, a minimum communication range for groupcast, indication on whether HARQ feedback is enabled or disabled, and an HARQ feedback mode.

* * * * *